United States Patent [19]

Tomisawa

[11] Patent Number: 4,715,344

[45] Date of Patent: Dec. 29, 1987

[54] LEARNING AND CONTROL APPARATUS FOR ELECTRONICALLY CONTROLLED INTERNAL COMBUSTION ENGINE

[75] Inventor: Naoki Tomisawa, Takasaki, Japan

[73] Assignee: Japan Electronic Control Systems, Co., Ltd., Japan

[21] Appl. No.: 891,967

[22] Filed: Aug. 1, 1986

[30] Foreign Application Priority Data

Aug. 5, 1985 [JP] Japan ............................... 60-171223
Sep. 24, 1985 [JP] Japan ............................... 60-208913

[51] Int. Cl.$^4$ ............................................. F02M 51/00
[52] U.S. Cl. .................................... 123/489; 123/416; 123/417
[58] Field of Search ............... 123/416, 417, 440, 480, 123/489

[56] References Cited

U.S. PATENT DOCUMENTS

| | | | |
|---|---|---|---|
| 3,483,851 | 12/1969 | Reichardt | 123/32 |
| 3,750,632 | 8/1983 | Zechnall | 123/32 A |
| 4,284,050 | 8/1981 | Suchowerskyj et al. | 123/483 |
| 4,552,115 | 11/1985 | Okino | 123/489 |
| 4,615,319 | 10/1986 | Tomisawa | 123/440 |

FOREIGN PATENT DOCUMENTS

211742 11/1984 Japan .
211738 11/1984 Japan .
203828 11/1984 Japan .
203829 11/1984 Japan .
 90944 5/1985 Japan .
 93143 5/1985 Japan .

Primary Examiner—Stephen F. Husar
Attorney, Agent, or Firm—Lowe, Price, LeBlanc, Becker & Shur

[57] ABSTRACT

A learning and control apparatus for an electronically controlled internal combustion engine having such an object to be controlled as, for instance a fuel injection valve for controlling the air-fuel ratio in an air-fuel mixture or an idle speed control valve for controlling the idle rotation number of the engine wherein a pulse duty signal corresponding to a basic control value is set according to engine driving states. The basic control value is corrected by adding an appropriate correction value to the basic control value. Feedback control is carried out so that the actual controlled value is made to follow the aimed control value, and a learning correction quantity is computed by learning said feedback control so that the feedback control amount is set as small as possible. Deviation value detecting means detects and operates a mean value of deviations of the feedback correction quantities from a standard value and learning correction quantity renewal means for a new learning correction quantity by adding the mean value of deviations by a selected ratio to a present learning correction quantity. The ratio of mean value of deviations is set in accordance with the number of renewal of learning correction quantity in such a manner as the ratio decreases when the number of renewal increases.

12 Claims, 12 Drawing Figures

LEARNING AND CONTROL APPARATUS FOR ELECTRONICALLY CONTROLLED INTERNAL COMBUSTION ENGINE

BACKGROUND OF THE INVENTION

1. Field of the Invention

The present invention relates to a learning and control apparatus for feedback control of an air-fuel ratio, an idle rotation number or the like in an electronically controlled internal combustion engine.

2. Conventional Techniques

As the conventional learning and control apparatus for an internal combustion engine, there can be mentioned an apparatus for learning and control of an air-fuel ratio, as disclosed in Japanese Patent Application Laid-Open Specification No. 90944/85, and an apparatus for learning and control of an idle rotation number, as disclosed in Japanese Patent Application Laid-Open Specification No. 93143/85.

The conventional techniques will now be described with reference to an apparatus for learning and control of a base air-fuel ratio, in which the air-fuel ratio is feedback-controlled to a theoretical air-fuel ratio is an aimed control value in an internal combustion engine provided with an electronically controlled fuel injection apparatus.

An electronically controlled fuel injection valve is opened by a driving pulse signal (injection pulse) given synchronously with the rotation of an engine and while the valve is opened, a fuel is injected under a predetermined pressure.

Accordingly, the injection quantity of the fuel depends on the period of opening of the valve, that is, the injection pulse width. Assuming that this pulse width is expressed as Ti and is a control signal corresponding to the injection quantity of the fuel, Ti is expressed by the following equations:

$$Ti = Tp \times COEF \times \alpha + Ts \text{ and } Tp = K \times Q/N$$

wherein Tp stands for the injection pulse width corresponding to the basic injection quantity of the fuel, which is called "basic fuel injection quantity" for convenience, K stands for a constant, Q stands for the flow quantity of air sucked in the engine, N stands for the rotation speed of the engine, COEF stands for various correction coefficients for correcting the quantity of the fuel, which is expressed by the following formula:

$$COEF = 1 + Ktw + Kas + Kai + Kmr + Ketc$$

in which Ktw stands for a coefficient for increasing the quantity of the fuel as the water temperature is lower, Kas stands for a correction coefficient for increasing the quantity of the fuel at and after the start of the engine, Kai stands for a correction coefficient for increasing the quantity of the engine after a throttle valve arranged in an intake passage of the engine is opened, Kmr stands for a coefficient for correcting the air fuel mixture, and Ketc stands for other correction coefficient for increasing the quantity of the fuel, $\alpha$ stands for an air-fuel ratio feedback correction coefficient for the feedback control ($\lambda$ control), described hereinafter, of the air-fuel ratio of the air-fuel mixture, and Ts stands for the quantity of the voltage correction for correcting the change of the flow quantity of the fuel injected by the fuel injection valve, which is caused by the change of the voltage of a battery.

In short, the desired injection quantity of the fuel is obtained by multiplying the basic fuel injection quantity Tp by various correction coefficients COEF, and when a difference is brought about between the aimed control value to be attained by the control and the actual controlled value, this difference is multiplied by $\alpha$ to effect the feedback control and the correction for the power source voltage is added to the feedback control.

This air-fuel ratio feedback correction control is disclosed in, for example, U.S. Pat. No. 4,284,050, U.S. Pat. No. 3,483,851 and U.S. Pat. No. 3,750,632.

However, in this air-fuel ratio feedback control, for example, when one constant driving region is greatly changed to a different constant driving region, if the base air-fuel ratio in this different stationary driving region is greatly deviated from $\lambda = 1$ ($\lambda$ stands for an actual air-fuel ratio), it takes too long a time to perform the feedback control (proportion and integration control ... PI control) of the change of the base air-fuel ratio generated by this deviation to $\lambda = 1$. More specifically, even though the base air-fuel ratio has been obtained from the specific injection quantity $Tp \times COEF$ and the deviation of this air-fuel ratio from the theoretical air-fuel ratio has been corrected by the PI control based on $\alpha$, since the base air-fuel ratio is greatly changed, the base air-fuel ratio is controlled to a value greatly different from $\lambda = 1$ if $Tp \times COEF$ used up to this time is still used, and the feedback correction by similar PI control should be performed and it takes a long time to correct the base air-fuel ratio to $\lambda = 1$ by the feedback correction.

The control system in which the above-mentioned disadvantage is eliminated by learning the control quantity controlled by the system and increasing the respondency of the air-fuel ratio control in the same driving state has been proposed by us in Japanese Patent Application Laid-Open Specifications No. 203828/74 and No. 203829/74 and U.S. patent application Ser. No. 604,025, now U.S. Pat. No. 4,615,319, issued Oct. 7, 1986.

According to this control system, learning control of the air-fuel ratio feedback control is first carried out. More specifically, in the air-fuel ratio feedback control region, if the base air-fuel ratio is deviated from the aimed air-fuel ratio $\lambda t$, since the feedback correction coefficient $\alpha$ is increased for compensating this gap during the process of transfer, the driving state at this time and $\alpha$ are detected, and a learning correction coefficient Kl based on this $\alpha$ is determined and stored. When the same driving state is brought about, the base air-fuel ratio is corrected to the aimed air-fuel ratio $\lambda t$ with a good respondency by the stored learning correction coefficient Kl. Storing of the learning correction coefficient Kl is performed for all of engine-driving state areas of a predetermined range formed by lattice division of a map of RAM according to the rotation speed of the engine and the engine-driving conditions such as the load.

More specifically, the map of the learning correction coefficient Kl corresponding to the rotation speed of the engine and the driving conditions of the engine such as the load is formed on RAM, and when the injection quantity Ti is calculated, the basic injection quantity Tp is corrected by Kl as shown by the following equation:

$$Ti = Tp \times COEF \times Kl \times \alpha + Ts \tag{1}$$

Learning of Kl is advanced according to the following procedures.
  (i) The engine-driving state in the constant state and the median $\alpha c$ of control of $\alpha$ (the mean value of a plurality of values Kl at the time of reversion of increase and decrease of the output signal of an $O_2$ sensor) are detected.
  (ii) The value Kl(old) heretofore learned, corresponding to the engine-driving state, is retrieved.
  (iii) The value of Kl(old) $+\overline{\Delta\alpha}/M$ is determined from $\alpha$ c and Kl(old), and the storage is renewed with the obtained value (learned value) being as new Kl (new).

Incidentally, $\Delta\alpha$ stands for the deviation from the standard valve $\alpha 1$ and expressed by $\Delta\alpha=\alpha-\alpha 1$. The standard value $\alpha 1$ is ordinarily set at 1.0 as the value corresponding to $\lambda=1$. M is a constant larger than 1.

An apparatus for learning and control of the idle rotation speed is applied to the case where an idle control valve is disposed in an auxiliary air passage bypassing a throttle valve and the opening degree of this idle control valve is adjusted to control the idle rotation speed. When the basic opening degree of the idle control valve corresponding to the aimed idle rotation speed for each temperature of cooling water for the engine is feedback-controlled while comparing the aimed idle rotation speed with the actual idle rotation speed, a map of learning correction quantities is formed according to the temperature of cooling water as a parameter of the engine driving state, the deviation of the feedback correction quantity from the base value is learned to correct the learning correction quantity, and the basic opening degree of the valve is corrected by this learning correction quantity to stabilize the control.

According to the above-described learning and control system which is served for controlling such an air fuel ratio of air-fuel mixture to be sucked into an engine, new learning correction coeffcient Kl(new) is operated in conformity with a formula mentioned herein-below and the preceding learning correction coefficient Kl(old) should be renewed by the Kl(new). The formula teaches that mean value $\overline{\Delta\alpha}$ of deviations $\Delta\alpha$ of feed-back correction coefficient $\alpha$ from a standard value $\alpha 1$ is operated and the new learning correction coefficient Kl(new) is operated by adding the mean deviation value $\overline{\Delta\alpha}$ by a predetermined ratio (1/M) to a present or former learning correction coefficient Kl(old).

$$Kl(new) \leftarrow Kl(old) + \overline{\Delta\alpha}/M$$

In this operating manner of Kl(new), advancing speed of learning Kl significantly depends on the selected value of M which decides the ratio for adding the mean deviation value $\overline{\Delta\alpha}$ i.e. the weighted ratio for mean deviation values.

In general, M is selected in a region including larger numbers which range from 8 to 32 so that the deviation from the standard value $\alpha 1$ can be gradually reduced since the above-mentioned kind of learning control system is effective to correct the deviation which is brought about based on deterioration of parts of the engine subjected to be used for a long term.

Learning Kl is carried on at each region restricted by engine driving parameter when engine driving states are in the region. Therefore by means of prior art of the learning control system above described, the frequency of learning occasion at each engine driving region is quite different from each other, then there remains a problem that learning can hardly advance at some engine driving regions where learning occasions are quite few when the selected value of M is large.

Further, learned value of learning correction coefficient Kl may happen to be canceled or cleared after the learning has advanced to a certain level when, for instance, a connection with a battery mounted on a vehicle and the learning and control apparatus for the electrically controlled engine is cut-off. The cancellation or clearance of the learned value may forcibly occur by means of system disclosed in the Japanese Patent Laid-Open Specification No. 211742/84. In such a case of cancellation or clearance of the learned value, it must take a quite long time to reduce or correct the deviation of basic air-fuel ratio by re-learning of Kl when the value of M is set a larger one or significant deterioration takes place on parts of the engine. Consequently, expected advantage of the learning and control system can not be profitably accepted during the re-learning.

Also in the apparatus disclosed in Japanese Patent Application Laid-Open Specification No. 211738/84, there arises the problem mentioned above in connection with learning and control of the fuel injection pulse width. According to this known technique, an idle control valve is disposed in an auxiliary air passage bypassing a throttle valve, and the opening degree of the idle control valve is adjusted according to the duty ratio of a pulse signal. The preset aimed rotation speed is compared with the actual rotation speed and feedback correction is effected, and a learning correction quantity stored RAM corresponding to the rotation speed is retrieved from the actual rotation speed. The weighted mean of the feedback correction quantity and the learning correction quantity is calculated, and the data in RAM are renewed by using this mean value as a new learning correction coefficient, and the above-mentioned feedback correction quantity and learning correction quantity are added to the preset basic control value of the pulse signal to operate the control valve of the pulse signal for controlling the idle control valve. As in case of learning and control of the fuel injection pulse width, re-learning cannot abruptly catch up with the large deviation of basic control value of the pulse signal when the learned value canceled.

SUMMARY OF THE INVENTION

The present invention has been completed under the above-mentioned background, and it is therefore a primary object of the present invention to provide a learning and control apparatus for an internal combustion engine, in which the speed of advance of learning can be controlled with a suitable value corresponding to the number of learning occasions.

It is another object of the present invention to provide a learning and control apparatus for the engine, in which quick relearning of learning correction quantity can be achieved even if learning correction quantity and the number of learning at each engine driving regions stored in a memory means canceled or cleared by some accident.

According to the learning and control apparatus for the engine of the present invention, a mean value of a deviation of a feed-back correction quantity from a standard value is detected and a new learning correction quantity is calculated by taking weighted mean of a preceding learning correction quantity stored in the memory means and the mean value of the deviation of the feed-back correction quantity. The preceding learning correction quantity in the memory means are renewed by using this weighted mean as a new learning correction quantity. The ratio for the weighted mean is changeable in conformity with the number of learning or of renewal at each engine driving region thereby the afore-mentioned object of the present invention is satisfied.

In the present invention, the object to be controlled is an electrically controlled fuel injection valve and a control value is the injection pulse width at the time of injection of fuel.

In the present invention, also an idle speed control valve of the internal combustion engine is the another object of control and the control value is the pulse width of the opening degree of the valve.

Moreover, the present invention can be applied to learning and control of the ignition timing in the internal combustion engine.

Figure 1:
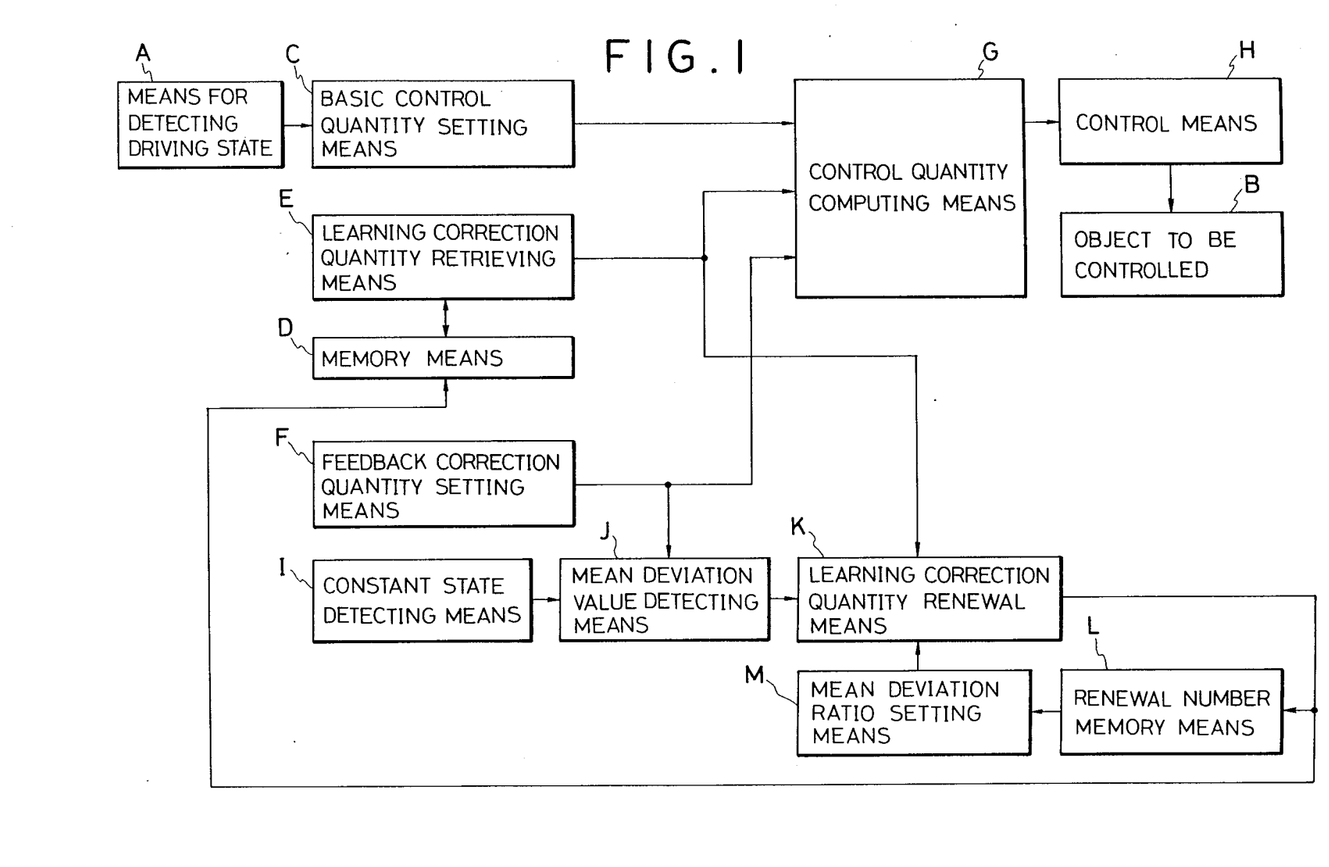
FIG. 1 is a block diagram of an air-fuel ratio learning and control apparatus according to the present invention for showing a function thereof.

The above-mentioned object and functions of the learning and control apparatus for the electronically controlled internal combustion engine according to the present invention can be attained by a system structure shown in a form of blocks diagram in FIG. 1 and described below. More specifically, the learning and control apparatus according to the present invention comprises (A) means for detecting driving states of the engine, (B) an object to be controlled according to a control value, (C) basic control quantity setting means for setting a basic control quantity corresponding to an aimed control value valve of the object to be controlled which is decided based on the detected engine driving state, (D) reloadable memory means for storing a plurality of regions with parameters of the engine driving state and learning correction quantities for correcting said basic control quantity for the respective regions, (E) learning correction quantity retrieving means for retrieving the learning correction quantity of the corresponding region from said memory means based on the detected actual engine driving state, (F) feedback correction quantity setting means for comparing the aimed control value with the detected actual value of the object to be controlled and setting a feedback correction quantity for correcting said basic control value by increasing or decreasing the feedback correction quantity by a predetermined quantity so that the actual value is brought close to the aimed control value, (G) control quantity computing means for computing a control quantity from the basic control quantity set by said basic control quantity setting means, the learning correction quantity retrieved by said learning correction quantity retrieving means and the feedback correction quantity set by said feedback correction quantity setting means, (H) control means for controlling the object to be controlled according to said control quantity, (I) constant state detecting means for detecting a constant driving state of the engine actually driven, (J) mean deviation value detecting means for detecting and operating a mean value of deviations of the feedback correction quantities from a standard value when the engine is in the constant driving state, (K) learning correction quantity renewal means for operating a new learning correction quantity by adding said mean value of deviations by a selected ratio to a present learning correction quantity retrieved by said learning correction retrieving means at every completion of said mean value deviations operation and for renewing the learning correction quantity stored in the memory means under the same driving regions by said new learning correction quantity, (L) renewal number memory means for storing the number of renewal of learning correction quantity in said memory means by receiving the output from said learning correction quantity renewal means under the same engine driving region, and (M) mean deviation ratio setting means for setting said ratio of mean value of deviations of the feedback correction quantities in accordance with the number of renewal of learning correction quantity in such a manner as the ratio decreases when the number of renewal increases. Above-mentioned (L) and (M) are the characterized structural components of the present invention.

The above-mentioned object and structure of the present invention will become more apparent from the following description concerning embodiments.

BRIEF DESCRIPTION OF THE DRAWING

FIG. 6, which consists of FIGS. 6A and 6B, is a flow chart illustrating a learning subroutine in FIG. 4.

DETAILED DESCRIPTION OF THE PREFERRED EMBODIMENTS

Figure 2:
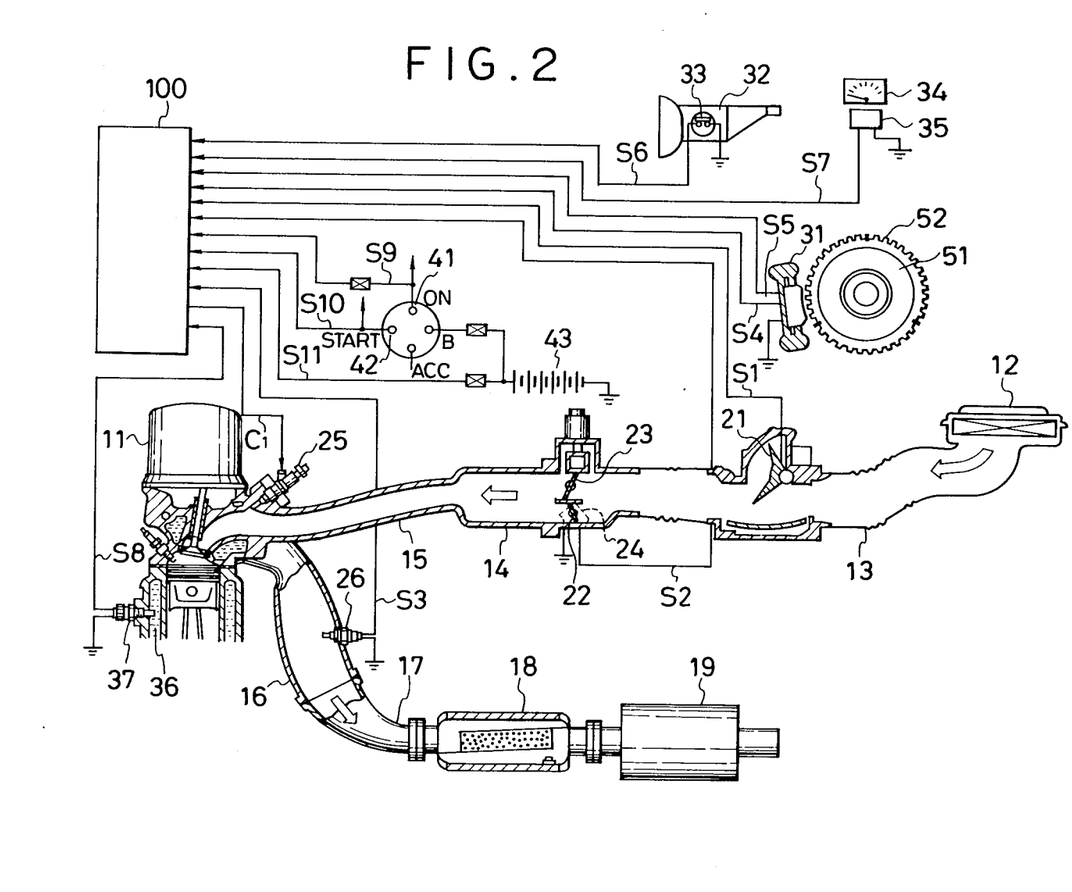
FIG. 2 is a schematic view illustrating an embodiment of the air-fuel ratio learning and control apparatus of the present invention.

Referring to FIG. 2, air is sucked in an engine 11 through an air cleaner 12, an intake duct 13, a throttle chamber 14 and an intake manifold 15 and an exhaust gas is discharged through an exhaust manifold 16, an exhaust duct 17, a ternary catalyst 18 and a muffler 19.

An air flow meter 21 is arranged in the intake duct 13 to put out a signal S1 of a flow quantity Q of intake air in the engine. The air flow meter 21 may be a hot wire type air flow meter. In the throttle chamber 14, a primary side throttle valve 22 interconnected with an accelerator pedal (not shown) and a secondary side throttle valve 23 are arranged to control the intake air flow quantity Q. A throttle sensor 24 of the variable resistor type is attached to a throttle shaft of the primary side throttle valve 22 to put out an electric current signal S2 corresponding to a change of the electric resistance corresponding to the turning angle, that is, the opening degree, of the throttle valve 22. An idle switch which is turned on when the throttle valve 22 is fully closed is mounted on the throttle sensor 24. A fuel injection valve 25 mounted on the intake manifold 15 or an intake port of the engine 11 is an electromagnetic fuel injection valve which is opened on actuation through a solenoid and is closed on deenergization. Namely, the valve 25 is actuated and opened through the solenoid by a driving pulse signal C1 to inject and supply into the engine the fuel fed under pressure from a fuel pump (not shown).

An $O_2$ sensor 26 acting as a means for detecting the concentration of an exhaust component is arranged in the exhaust manifold 16. The $O_2$ sensor 26 is a known sensor which puts out a voltage signal S3 corresponding to the ratio of the oxygen concentration in the exhaust gas to air and the electromotive force of which is abruptly changed when an air-fuel mixture is burnt at the theoretical air-fuel ratio (see FIG. 7). Accordingly, the $O_2$ sensor is a means for detecting the air-fuel ratio of the air-fuel mixture. The ternary catalyst 18 is a catalystic device for oxidizing or reducing CO, HC and NOx in the exhaust gas component at a high efficiency at an air-fuel ratio close to the theoretical air-fuel ratio of the air-fuel mixture to convert them to harmless substances.

These air flow meter 21, throttle sensor 24 and $O_2$ sensor 26 constitute main parts of the means for detecting the driving state of the engine and detection signals S1 through S3 of said detecting means are put out into a control unit 100. The means for detecting the driving state of the engine, which puts out these detection signals to the control unit 100, comprises, in addition to the above-mentioned members, a crank angle sensor 31, a neutral switch 33 mounted on a transmission 32, a car speed sensor 35 mounted on a speed meter 34 of a car, and a water temperature sensor 37 for detecting the temperature of cooling water in a water jacket 36 for cooling the engine or cooling water in a thermostat housing of the cooling water circulation system. The crank angle sensor 31 is arranged to detect a rotation speed N of the engine and a crank angle (piston position), and a signal disc plate 52 is mounted on a crank pulley 51 and a crank angle sensor 31 puts out a reference signal S4 by, for example, every 180° in the crank angle in case of a 4-cylinder engine or by every 120° in the crank angle to case of a 6-cylinder engine and a position signal S5 by, for example, every 1° in the crank angle according to teeth formed on the periphery of the plate 52. When the transmission 32 is set at the neutral position, the neutral switch 33 detects this and puts out a signal 56. The car speed sensor 35 detects the car speed and puts out a car speed signal S7. The water temperature sensor 37 puts out a voltage signal S8 changing according to the change of the temperature of cooling water corresponding to the temperature of the engine.

The means for detecting the driving state of the engine further comprises an ignition switch 41 and a start switch 42. The ignition switch 41 is a switch for applying a voltage of a battery 43 to an ignition device and putting out an on-off signal S9 to the control unit 100. The start switch 42 is a switch which is turned on when a starter motor is driven to start the engine and which puts out an on-off signal S10. The terminal voltage of the battery 43 is put out to the control unit 100 by a signal S11.

The detection signals S1 through S11 emitted from the respective elements of the means for detecting the driving state of the engine are put into the control unit 100 where the operation processing is carried out to put out a signal C1 of an optimum injection pulse width to the fuel injection valve and obtain a fuel injection quantity giving an optimum air-fuel ratio.

Figure 3:
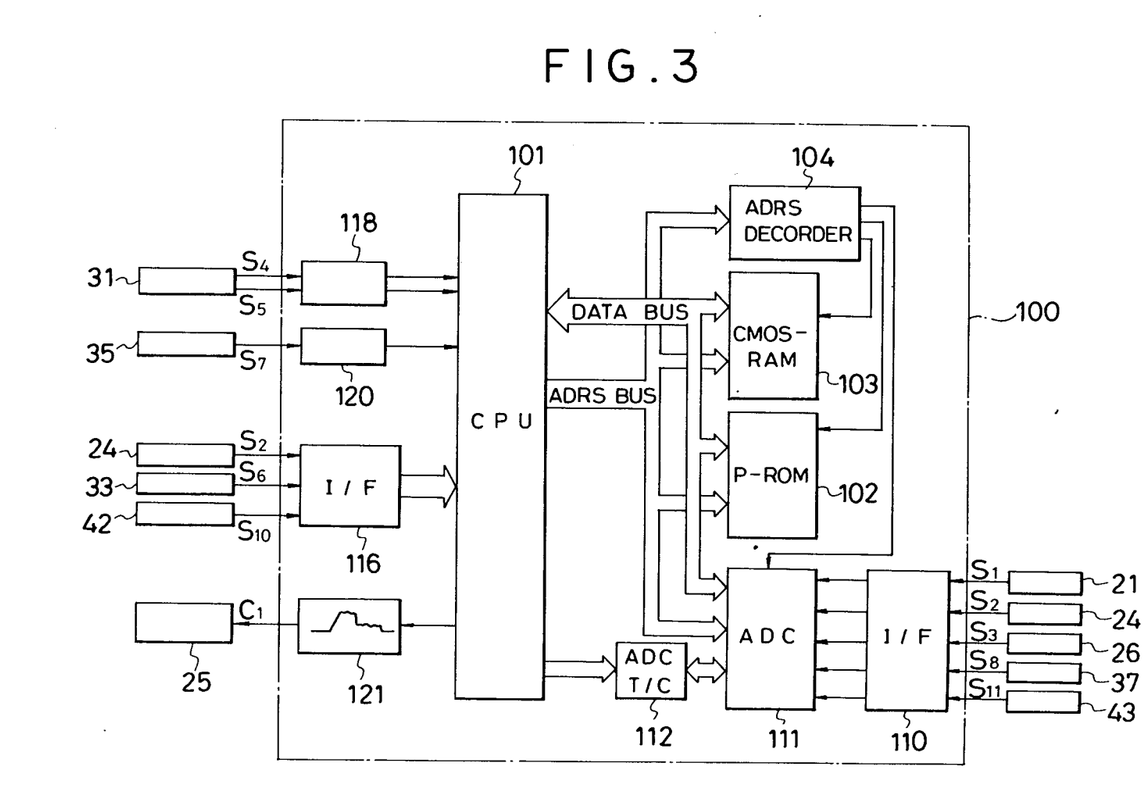
FIG. 3 is a block diagram illustrating the hard ware structure of a control unit used in one embodiment of the present invention.

The control unit 100 comprises CPU 101, P-ROM 102, CMOS-RAM 103 for the learning control of the air-fuel ratio and an address decoder 104, as shown in FIG. 3. A back-up power source circuit is used for RAM 103 to retain the content of the memory after the ignition switch 41 has been turned off.

As analogue input signals to be put in CPU 101 for the control of the fuel injection quantity, there can be mentioned the signal S1 of the intake air flow quantity Q from the air flow meter 21, the throttle opening degree signal S2 from the throttle sensor 24, the water temperature signal S8 from the water temperature sensor 37, the signal S3 of the oxygen concentration in the exhaust gas from the $O_2$ sensor 26 and the battery voltage signal S11. These signals are put in CPU 101 through an analogue input interface 110 and an A/D converter 111. The A/D converter 111 is controlled by CPU 101 through an A/D conversion timing controller 112.

As digital input signals, there can be mentioned the idle switch signal S2 which is turned on when the throttle valve 22 is fully closed, and on-off signals S10 and S6 supplied from the start switch 42 and the neutral switch 33. These signals are put in CPU 101 by way of a digital input interface 116.

Furthermore, for example, the reference signal S4 and position signal S5 from the crank angle sensor 31 are put in CPU 101 through a one-shot multichip circuit 118. Moreover, the car speed signal S7 from the car speed sensor 35 is put in CPU 101 through a wave shaping circuit 120.

The output signal from CPU 101(driving pulse signal to the fuel injection valve 25) is supplied to the fuel injection valve 25 through a current wave control circuit 121.

Figure 4:
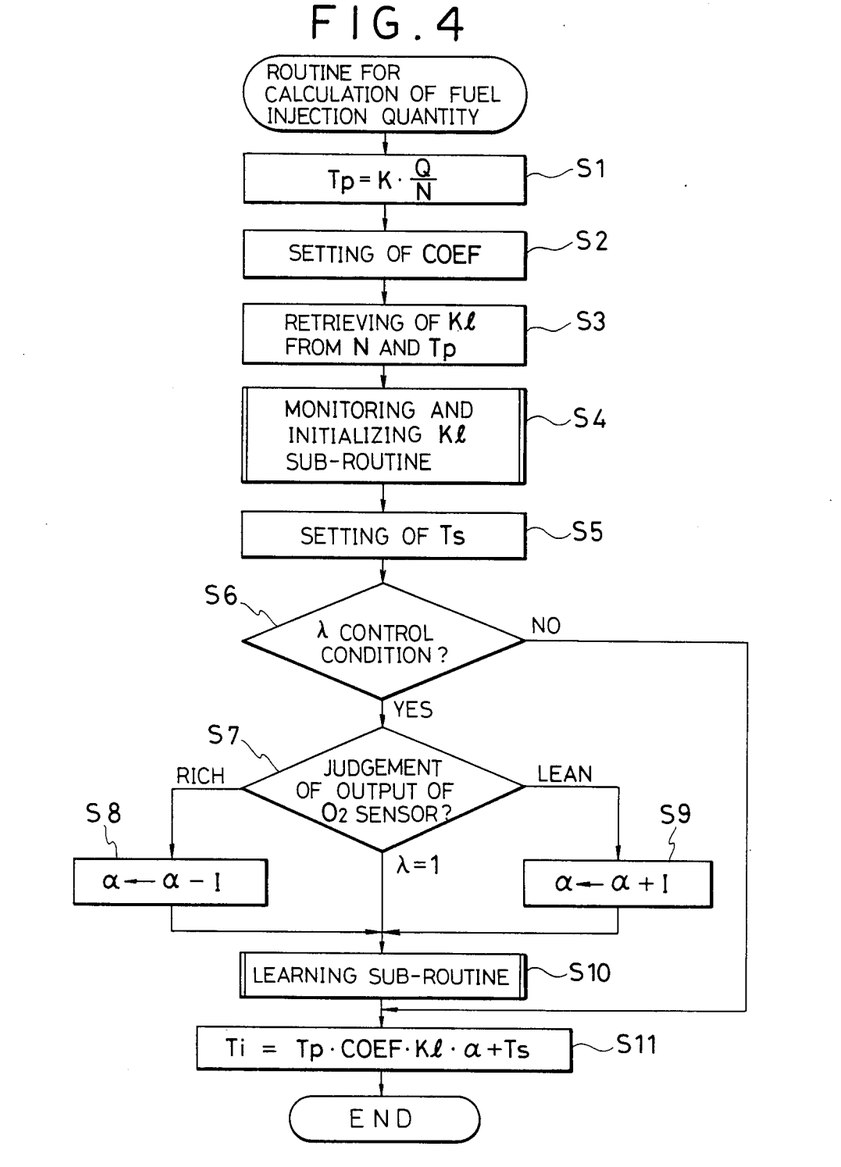
FIG. 4 is a flow chart illustrating the operation of the air-fuel ratio learning and control apparatus shown in FIGS. 2 and 3.

CPU 101 controls the fuel injection quantity by performing input output operations and computing processings according to a program(stored in ROM 102)based on a flow chart shown in FIG. 4.

The functions of the basic control quantity (basic fuel injection quantity) setting means, the learning correction quantity (coefficient) retrieving means, the feedback correction quantity (coefficient) setting means, the control quantity (fuel injection quantity)computing means, the learning correction quantity (coefficient ) correcting means, the control means, the constant state detecting means, the learning correction quantity renewal means, the renewal number memory means, and mean deviation ratio setting means are exerted according to the above-mentioned program.

The operations will now be described with reference to the flow chart of FIGS. 4 to 6.

In the fuel injection quantity calculating routine shown in FIG. 4 at step 1(S1 in the drawings), the base fuel injection quantity $Tp(=K \cdot Q/N)$ is calculated from the flow quantity Q of sucked air obtained by a signal of the air flow meter 21 and the rotation number N of the engine obtained by a signal of the crank angle sensor 31. This portion corresponds to the basic control value computing means.

At step 2, various correction coefficients COEF are set according to need.

At step 3, from the rotation number N of the engine and the basic fuel injection quantity (load) Tp, which represent the driving state of the engine, the corresponding learning correction coefficient Kl is retrieved. This portion corresponds to the learning correction coefficient retrieving means.

A map in which the engine rotation number N is plotted on the abscissa and the base fuel injection quantity Tp is plotted on the ordinate is divided into regions by about 8×8 lattices, and the learning correction coefficient Kl for each region is stored in memory means, RAM 103. Incidentally, before initiation of learning, all of the learning correction coefficients Kl are set at the initial value of 1.

Figure 5:
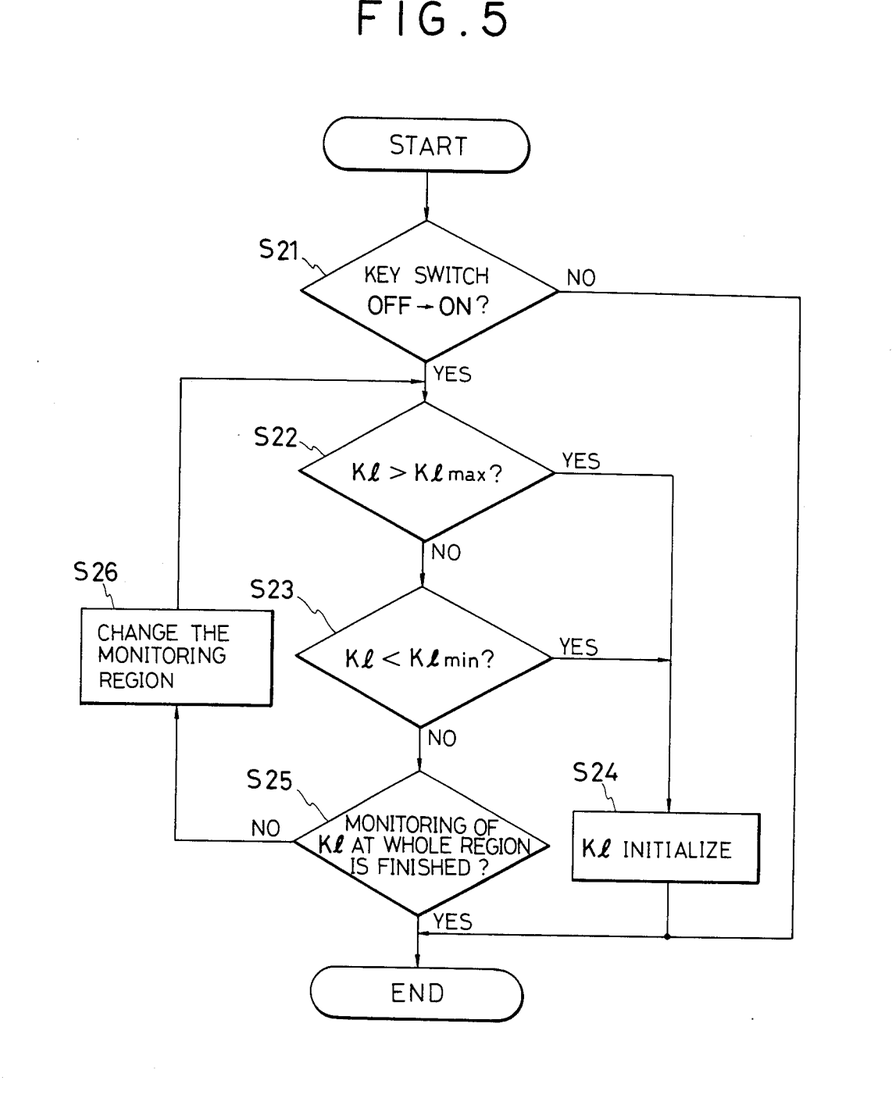
FIG. 5 is a flow chart illustrating initializing subroutine in FIG. 4.

At step 4, at least one learning correction coefficient Kl retrieved at step 3 is judged abnormal at an engine key turned ON, the learning correction coefficients Kl in the whole engine driving regions are initialized as is shown in detail in FIG. 5 illustrating a sub-routine for intializing Kl. In FIG. 5, when the engine key is turned on(at S21), the retrieved learning correction coefficient Kl in an engine driving region is compared with the upper most level Klmax at step 22 and with the lower most level Klmin at step 23. In case of Kl>Klmax or Kl<Klmin, all of learning correction coefficients Kl stored in whole engine driving regions are initialized at step 24. When the Kl retrieved is between Klmax and Klmin, another learning correction coefficient Kl in another engine driving region (at step 26 ) is monitored in the same manner until all of learning correction coefficients Kl in the whole engine driving regions are judged at normal level at step 25.

When memories (RAM) are subjected to a strong electric field produced by, for instance , electric wave, a part of values or all of values stored in the memories may be canceled of forcibly changed at random. Especially in such a case as memory is partially destroyed, the learning correction coefficients Kl stored in the neighboring engine driving regions are undergone to have quite different values each other. As a result since the learning correction coefficient Kl is abruptly changed at the boundary between two neighboring regions, a feed-back air-fuel ratio control hardly catches over with the abrupt difference of Kl to deteriorate reliability or accuracy of air-fuel ratio control, exhaust gas components and drivability. The monitoring learning correction coefficient Kl at step 4 is capable to eliminate the afore-described defects.

At step 5, the voltage correction value Ts is set based on the voltage of the battery 43.

At step 6, it is judged whether or not the condition is the λ control condition.

In the case where the condition is not the λ control condition, for example, in case of high-rotation high-load region, the routine goes to step 11 described below from step 6 in the state where the feedback correction coefficient α is clamped to the precedent value (or standard value of 1).

In case of the λ control condition, at steps 7 through 9, the output voltage Vo2 of the O2 sensor 26 is compared with the slice level voltage Vref corresponding to the theoretical air-fuel ratio and it is judged whether the air-fuel ratio is rich or lean, and the feedback correction coefficient α is set by integration control or proportional integration control. This portion corresponds to the feedback correction coefficient setting means. More specifically, in case of integration control, if by comparison at step 7, it is judged that the air-fuel ratio is rich (Vo2>Vref), the feedback correction coefficient α is set by reducing a predetermined integration portion (I) from the preceding value at step 8. In contrast, if it is judged that the air-fuel ratio is lean (Vo2<Vref), at step 9 the feedback correction coefficient λ is set by adding the predetermined integration portion (I) to the preceding value. In case of proportional integration control, in addition to the above-mentioned control, at the time of rick-lean inversion, a predetermined proportional portion (P) larger than the integration proportion (I) is subtracted or added in the same direction as that of the intergration portion (I).

Figures 6, 6A:
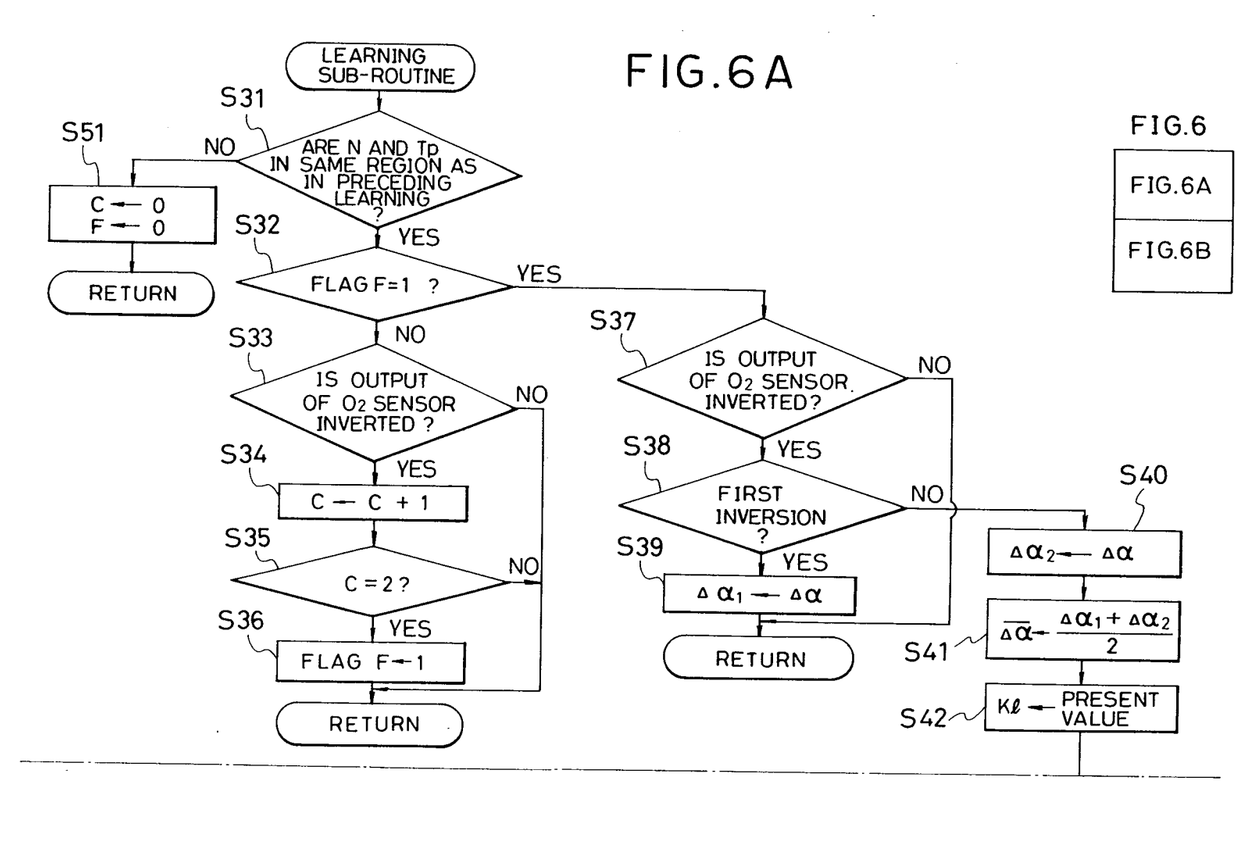
Figure 6B:
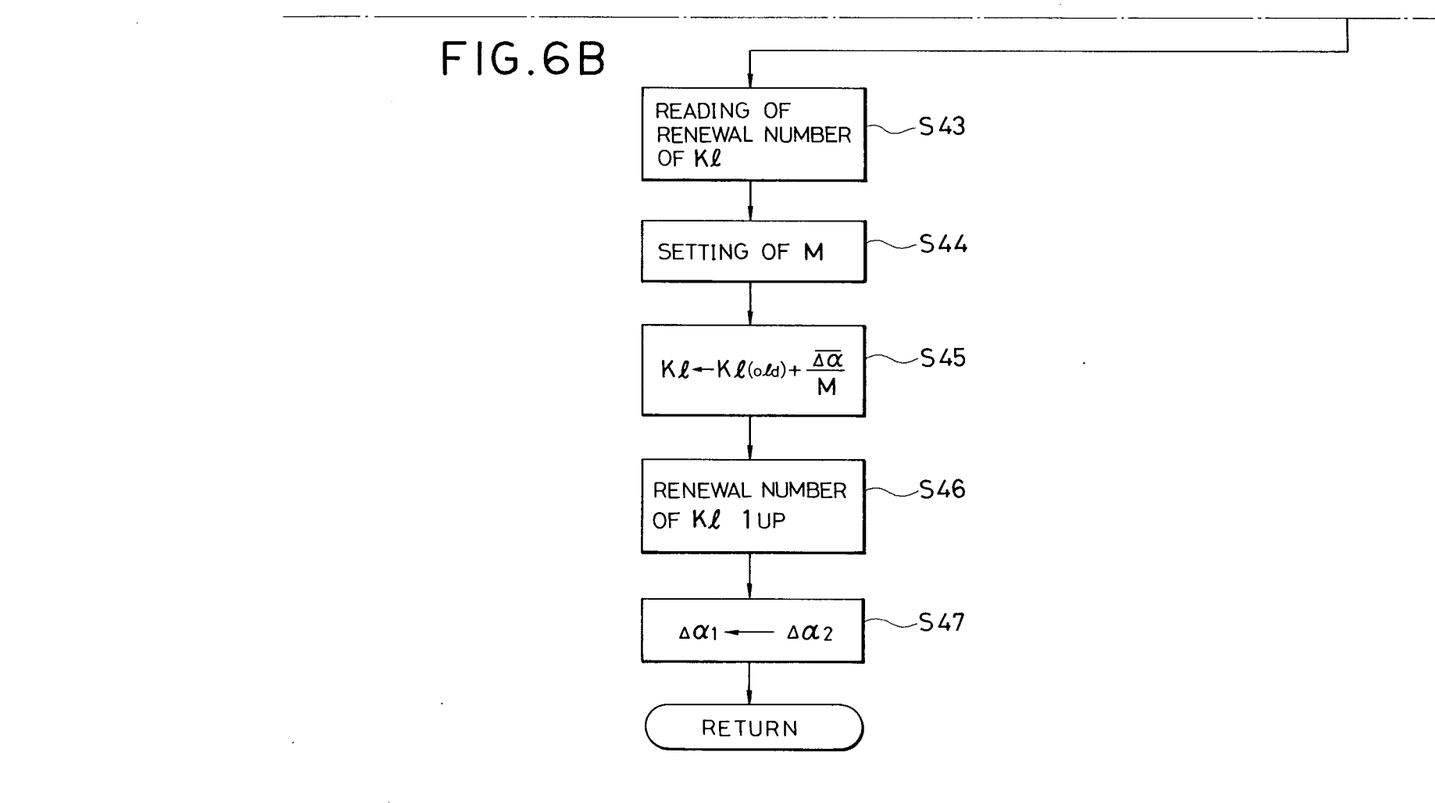

At step 10, the operation of the learning sub-routine shown in FIG. 6 is carried out, as described hereinafter.

Then, at step 11, the fuel injection quantity Ti is calculated according to the equation of $Ti = Tp \cdot COEF \cdot Kl \cdot \alpha + Ts$.

This portion corresponds to the control value computing means.

Incidentally, the value retrieved at step 4 or the value corrected through the learning sub-routine shown in FIG. 6 is used as Kl.

If the fuel injection quantity Ti is calculated, a driving pulse signal having the pulse width of this Ti is put out at a predetermined timing synchronously with the rotation of the engine and given to the fuel injection valve 25 through the current wave control circuit 121. This portion corresponds to the control means.

The learning sub-routine shown in FIG. 6 will now be described.

At step 31, it is judged whether or not the engine rotation number N and basic fuel injection quantity Tp which represent the driving state of the engine are in the same region as the preceding region. In case of "Yes", at step 32 it is judged whether or not a flag F is set. If the flag F is not set, at step 33 it is judged whether or not the output of the O2 sensor 26 is inverted, that is, whether or not the increase-decrease direction of the feedback correction coefficient α is inverted. This flow is repeated and at every inversion, the count value indicating the inversion frequency is increased by 1 at step 34, and when the count value becomes 2, the routine goes to step 26 from step 25 to set the flag F. When the output of the O2 sensor 26 is inverted 2 times in the same region, this flag F is regarded as becoming constant driving state and is set. After setting of the flag F, if the same region is judged at step 31, the routine goes to step 37 through step 32. At steps 32 through 36, the constant state is detected if (1) the driving state of the engine is in one of the sectioned regions and (2) the increase-decrease direction of the feedback correction coefficient α is inverted at least a predetermined number of times (at least 2 times).

In the constant state, at step 37 , it is judged whether or not the output of the O2 sensor 26 is inverted, that is, whether or not the increase-decrease direction of the feedback correction coefficient α is inverted, and this flow is repeated and when inversion is caused, at step 38 it is judged whether or not the inversion is the first inversion after judgement of the constant engine driving state, that is, whether or not the inversion is the third inversion in the same region. This portion corresponds to the constant state detecting means. When it is judged that the inversion is the third inversion, at step 39 the deviation $\Delta \alpha (= \alpha - \alpha 1)$ of the present feedback correction coefficient α from the standard value α1 is temporarily stored as Δα1. Then, if the fourth inversion is detected, the routine goes to steps 40 through 46, and learning is carried out based on data between the third inversion and the fourth inversion (see FIG. 7). When the fifth inversion and subsequent inversions are detected, the routine similarly goes to steps 40 through 46 and learning is carried out based on the preceding inversion and the present inversion.

Figure 7:
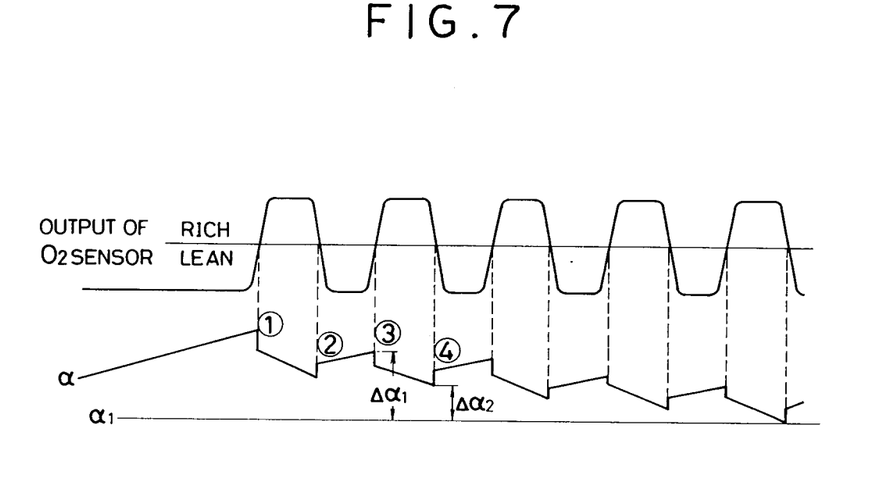
FIG. 7 is a graph illustrating the output voltage characteristics of an $O_2$ sensor.

At the fourth inversion and subsequent inversions, the deviation $\Delta\alpha(=\alpha-\alpha1)$ of the present feedback correction coefficient $\alpha$ from the standard value $\alpha1$ is temporarily stored as $\Delta\alpha2$ at step 40. As shown in FIG. 7, the stored $\Delta\alpha1$ and $\Delta\alpha2$ values are upper and lower peak values of $\Delta\alpha$ between the preceding inversion (for example, the third inversion) and the present inversion (for example, the fourth inversion).

Since the mean value of the deviation $\Delta\alpha$ can be calculated based on these upper peak values $\Delta\alpha1$ and $\Delta\alpha2$, at step 41 the mean value $\overline{\Delta\alpha}$ of the deviation $\Delta\alpha$ is calculated according to the formula of $\overline{\Delta\alpha}=(\Delta\alpha1+\Delta\alpha2)/2$.

Then, at step 42 the learning correction coefficient Kl stored in correspondence to the present region is retrieved. However, practically, the value retrieved at step 3 can be used.

At step 43, a data of renewal number of a learning correction coefficient stored in the present engine driving region is read. The data of renewal number has been stored in every engine driving region divided by engine driving parameters of the engine revolution number N and the basic fuel injection quantity Tp as same in case of the learning correction coefficient Kl. This portion corresponds to the renewal number memory means.

At step 44, M, which decides a weighted mean value of the preceding learning correction coefficient and the present learning correction coefficient, is retrieved from a map on the ROM 102 in accordance with the retrieved renewal number of Kl under the same engine driving region and set. The portion of steps 44 and 45 corresponds to the mean deviation ratio setting means. Incidentally the value of M may be set to 1.0 when the renewal number of Kl is 1 and to be increased in accordance with increasing of the renewal number of Kl.

At step 45, a new learning correction coefficient Kl(new) is operated in conformity of the following formula by adding mean value $\overline{\Delta\alpha}$ of the deviations $\Delta\alpha(=\alpha-\alpha1)$ from a standard value $\alpha1$ of the feedback correction coefficient $\alpha$ by a predetermined weighted ratio (1/M) to the preceding learning correction coefficient. The preceding learning correction coefficient Kl←(old) is renewed by the newly operated learning correction coefficient Kl(new) under the same engine driving region. The step 45 corresponds to the learning correction quantity renewal means.

$$Kl(new) \leftarrow Kl(old) + \overline{\Delta\alpha}/M$$

At step 46, the value of renewal number of Kl stored under the corresponding engine driving region is countered by 1 up increment. The portion of step 46 as well as RAM 103 correspond to the renewal number memory means. Then, at step 47, $\Delta\alpha2$ is substituted for $\Delta\alpha1$ for the next operation routine.

When the detected actual engine driving state is judged different from the preceding one at step 31, the counted value C is cleared and the Flag F is reset at step 51.

As is apparent from the above-description, the value of M can be changed according to the renewal number of the learning correction coefficiency Kl, i,e, the advancing degree of learning of Kl and this results in the learning advance speed of Kl in the engine driving region, where the number of occasion being capable to learn Kl is quite few, made faster. Further, even when the data of learning correction coefficient Kl or of the renewal number of Kl stored in RAM 103 is initialized by disconnecting the battery 20 with CPU 101 and RAM 103 and the the renewal number of Kl is reset to 0, the value of 1/M can be automatically increased. This effects a rapidly relearning of Kl.

The following method shows to forcibly clear the learning correction coefficient in RAM 103 and the data of the number of renewal after the battery 20 has been disconnected.

Figure 8:
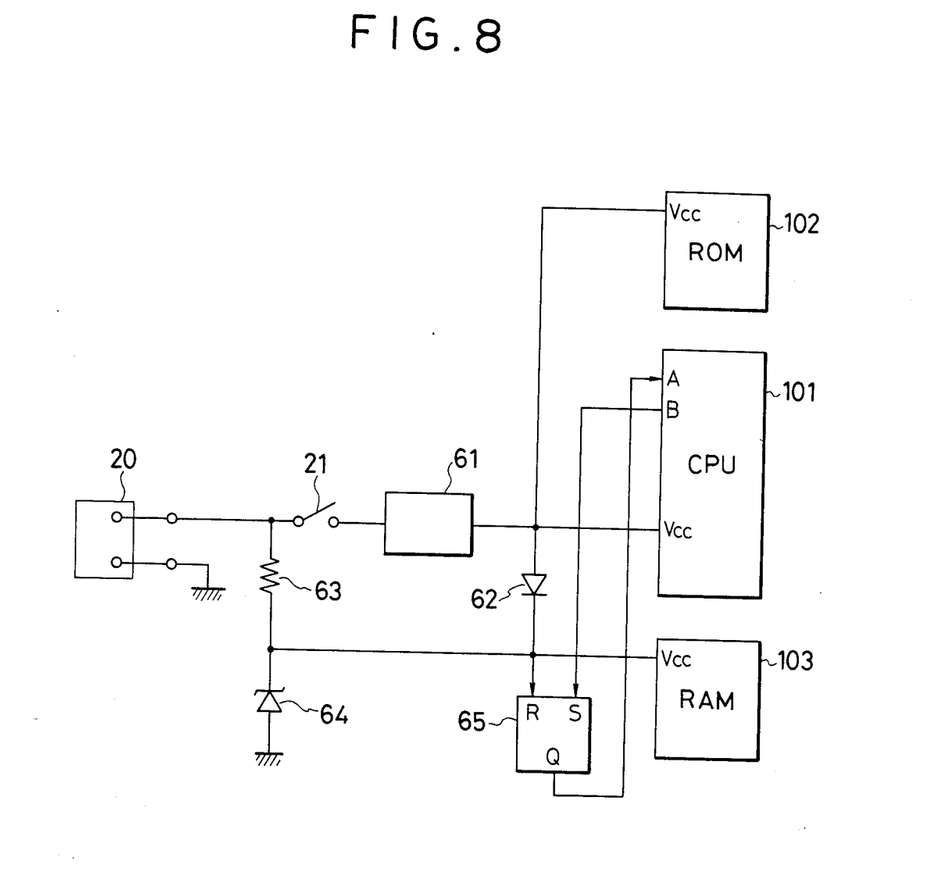
FIG. 8 is an electrical circuit for memory back-up.

As shown in FIG. 8 an electric source is supplied to CPU 101 and ROM 102 from the battery through an engine key switch 21 and stabilizer regulator 61. When the engine key switch 21 is on, the power source is supplied from the stabilizer regulator 61 through the diode 62, and when the engine key switch is off, the power source is supplied from a back-up power circuit 65 is a flip-flop a reset (R) terminal of which is connected with a power source terminal of RAM 103. An out put (Q) terminal of the flip-flop us connected with a port A of CPU 101 and a port B of CPU 101 is connected with a set (S) terminal of the flip-flop 65.

Figure 9:
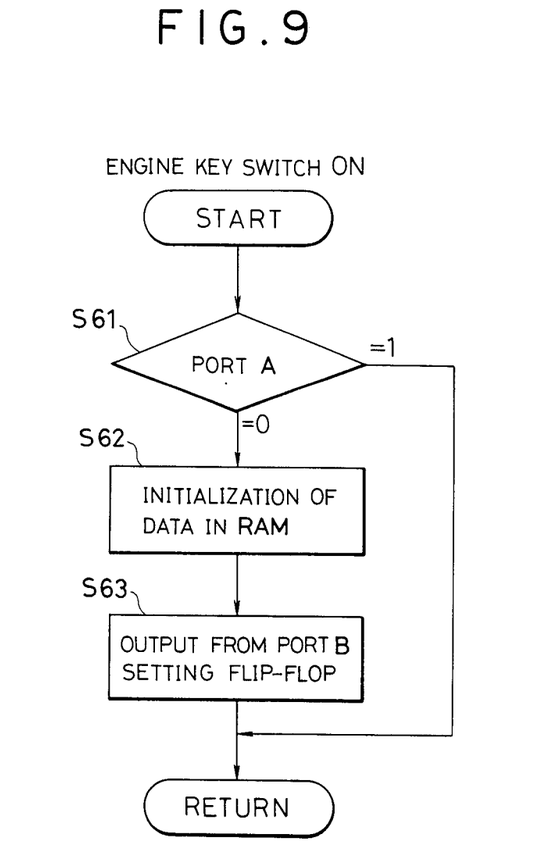
FIG. 9 is a flow chart illustrating memory back-up monitor routine.

Hereupon, according to the program (stored in ROM 32) based on the flow chart (memory back-up monitor routine actuated at turning-on of the engine key switch 21) in FIG. 9, CPU 101 decides whether or not the back-up of memory has been properly carried out at turning-on of the engine key switch 21, and if not, suitable procedures are taken.

Next, the flow chart in FIG. 9 will be described.

At step 61, whether the in-put (namely, the output of the flip-flop 65) of the port A of CPU 101 is one or zero is decided. In case of decided as one, which is determined to be normal, this routine is finished. In case of decided as zero, which is determined to be abnormal, it advances to the next step 62.

At step 62, all the data in RAM 103 are returned to the initialized values. That is, all the data of the learning correction coefficient Kl are set to be one, and all the data of the renewal number are set to be zero. Next, it advances to the step 63.

At step 63, the out-put of one emits from the port B of CPU 101, the flip-flop 65 is reset and the out-put is returned to one.

Figure 10:
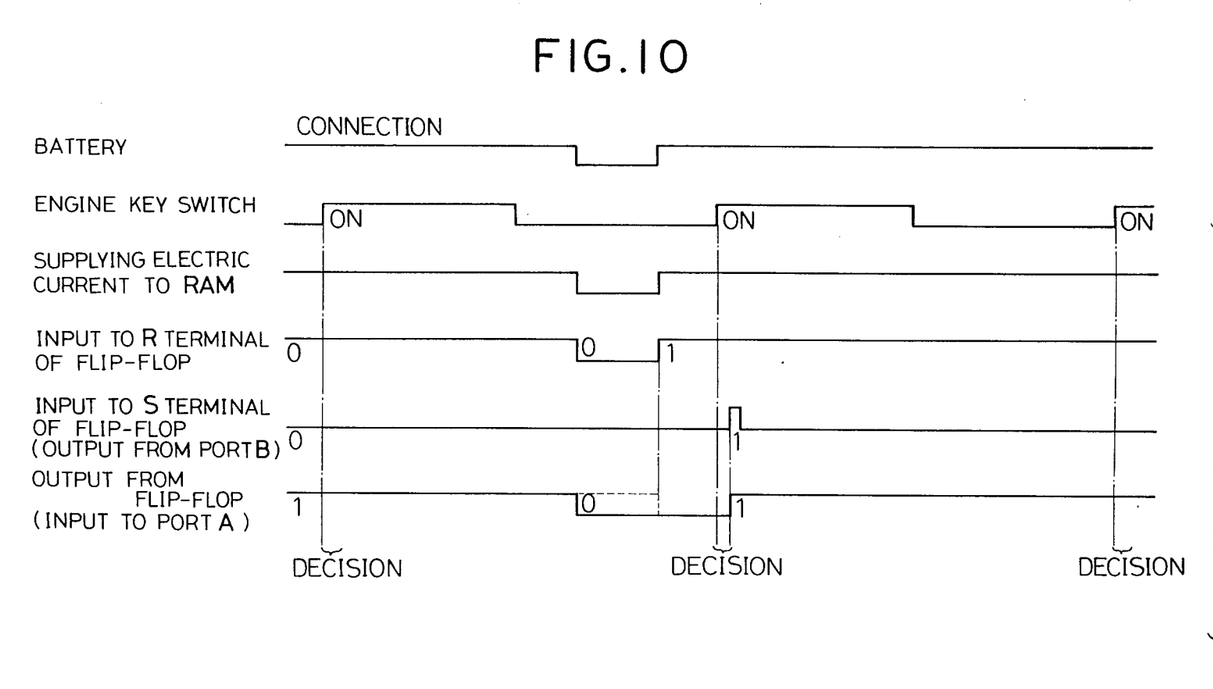
FIG. 10 is a timing chart illustrating the function of the electrical to circuit shown in FIG. 8.

Accordingly, when the battery 31 is disconnected and the electric current to RAM 103 is cut while the engine key switch is off(cf. FIG. 10), the output to $\lambda$ terminal of the flip-flop 65 is cancelled, and when the battery 20 is connected again, the input to R terminal of the flip-flop 65 is set to be one. At the same time, the flip-flop 65 is reset, and the output is set to be zero.

When the engine key switch 21 is on and the routine shown in the flow chart of FIG. 9 is performed after that, the fact that the memory is destroyed is detected since the input of the port A (namely, the output of the flip-flop 65) is zero. In this case, all the data in RAM 103 are returned to the initialized values, learning is carried out from the beginning, the flip-flop 65 is set and its output is returned to one by setting the output of port B as one and feeding it to S terminal of the flip-flop 65.

If the battery 20 is not disconnected while the engine key switch is off, the memory is decided to be normally backed up since the input of the port A (namely, the output of the flip-flop 65) is one when the engine key switch is turned on, the data in RAM 103 is kept being used.

The learning control apparatus for the air-fuel ratio has been described so far, but the present invention can be naturally applied to a learning control apparatus for idle rotation number.

More specifically, for the learning control apparatus for the idle rotation number, the basic control amount ISCtw is determined based on the engine cooling water temperature, the learning correction quantity ISCle is retrieved from the water temperature and the feed-back correction quantity ISC fb is determined based on the comparison between the aimed idle rotation number Ns determined based on the water temperature and the actual idle rotation number. The control quantity ISCdy to an idle control value 10 is operated by the following equation (1) and learning is executed according to the following equation (2) in a normal state. In this case, when the mean value $\overline{\Delta ISCfb}$ of deviations from the standard value of the feed-back correction amount ISCfb is added by the prescribed ratio (1/M), the value M may be set according to the renewal rotation number.

$$ISCdy = ISC + w + ISCle + ISC + b \qquad (1)$$

$$ISCle(new) \leftarrow ISCle + \overline{\Delta ISCfb}/M \qquad (2)$$

Aforementioned idle control valve is provided with a opening-valve coil and a closing-valve coil and so constituted that pulse signals which have been decided are sent to these coils and the opening degree is adjusted according to the duty ratio of the pulse signal. Aforementioned ISCdy stands for the time ratio ( % ) when the opening valve coil is on.

According to the present invention described hitherto, the speed of learning advance can be quickened in the region where learning occasions are few by changing the weighted value at the renewal of the learning correction quantity corresponding to the advancing degree of learning. Moreover, when the data of learning correction quantity is cleared by disconnecting of the battery and the like, rapid re-learning can be possible.

What is claimed is:

1. A learning and control apparatus for an electronically controlled internal combustion engine, which comprises means for detecting driving states of the engine, an object to be controlled according to a control value, basic control quantity setting means for setting a basic control quantity corresponding to an aimed control value of the object to be controlled which is decided based on the detected engine driving state, reloadable memory means for storing a plurality of regions with parameters of the engine driving state and learning correction quantities for correcting said basic control quantity for the respective regions, learning correction quantity retrieving means for retrieving the learning correction quantity of the corresponding region from said memory means based on the detected actual engine driving state, feedback correction quantity setting means for comparing the aimed control value with the detected actual value of the object to be controlled and setting a feedback correction quantity for correcting said basic control value by increasing or decreasing the feedback correction quantity by a predetermined quantity so that the actual value is brought close to the aimed control value, control quantity computing means for computing a control quantity from the basic control quantity set by said basic control quantity setting means, the learning correction quantity retrieved by said learning correction quantity retrieving means and the feedback correction quantity set by said feedback correction quantity setting means, control means for controlling the object to be controlled according to said control quantity, constant state detecting means for detecting a constant driving state of the engine actually driven, mean deviation value detecting means for detecting and operating a mean value of deviations of the feedback correction quantities from a standard value when the engine is in the constant driving state, learning correction quantity renewal means for operating a new learning correction quantity by adding said mean value of deviations by a selected ratio to a present learning correction quantity retrieved by said learning correction retrieving means at every completion of said mean value deviations operation and for renewing the leaning correction quantity stored in the memory means under the same driving regions by said new learning correction quantity, renewal number memory means for storing number of renewal of learning correction quantity in said memory means by receiving the output from said learning correction quantity renewal means under the same engine driving region, and mean deviation ratio setting means for setting said ratio of mean value of deviations of the feedback correction quantities in accordance with the number of learning correction quantity in such a manner as the ratio decreases when the number of renewal increases.

2. A learning and control apparatus for an electronically controlled internal combustion engine as set forth claim 1, wherein said object to be controlled is amount of fuel injection from fuel injection means mounted on the engine which is opened and closed in an on-off manner by a driving pulse signal of said control means.

3. A learning and control apparatus for an electronically controlled internal combustion engine as set forth claim 1, wherein said object to be controlled is idle rotation number of said engine provided with idle speed control valve in which said valve determines the opening degree of passage bypassing a throttle valve arranged in an intake passage by minute oscillation in the opening and closing direction according to a driving pulse signal of said control means.

4. A learning and control apparatus for an electronically controlled internal combustion engine as set forth claim 1, which further comprises means for detecting an abnormal condition of said memory means for storing the learning correction quantity, and initializing means for initializing all the learning correction quantity stored in said memory means when the abnormal condition of said memory means is detected.

5. A learning and control apparatus for an electronically controlled internal combustion engine as set forth claim 4, wherein said means for detecting the abnormal condition of said memory means detects same at the engine key switch is turned on .

6. A learning and control apparatus for an electronically controlled internal combustion engine as set forth claim 4, wherein said means for detecting the abnormal condition of said memory means detects disconnection of electrical power source with said memory means.

7. An apparatus for learning and electronically controlling air-fuel ratio in an internal combustion engine, which comprises means for detecting the driving state of the engine, which includes first detecting means for detecting the flow quantity Q of air sucked in the engine, second detecting means for detecting the engine speed N and third detecting means for detecting exhaust components of the engine and detecting the actual value of the air-fuel ratio in an air-fuel mixture sucked in the engine, fuel injection means for injecting fuel according to fuel injection quantity, basic fuel injection quantity setting means for setting a basic fuel injection quantity corresponding to an aimed air-fuel ratio from the flow quantity of sucked air put out from the first detecting means and the engine speed N put out from the second detecting means, reloadable memory means for storing a plurality of regions with parameters of the engine driving states N and Q and learning correction coefficient Kl for correcting the basic fuel injection quantity for the respective regions of the driving state of the engine, learning correction coefficient retrieving means for retrieving the learning correction coefficient Kl of the corresponding region from said memory means based on the detected actual driving state of the engine, feedback correction coefficient setting means for comparing the detected air-fuel ratio put out from the third detecting means with the aimed air-fuel ratio and setting a feedback correction coefficient $\alpha$ for correcting the basic fuel injection quantity by increasing or decreasing the feedback correction coefficient $\alpha$ by a predetermined quantity so that the actual air-fuel ratio is brought close to the aimed air-fuel ratio, fuel injection quantity computing means for computing the fuel injection quantity based on the basic fuel injection quantity computed by said basic fuel injection quantity computing means, the learning correction coefficient Kl retrieved by the learning correction coefficient retrieving means and the feedback correction coefficient set by the feedback correction coefficient setting means, control means operated according to said fuel injection quantity Ti to control said fuel injection means in an on-off manner by a driving pulse signal, constant state detecting means for detecting a constant driving state of the engine actually driven, mean deviation value $\overline{\Delta}$ detecting means for detecting and operating a mean value of deviations $\overline{\Delta\alpha}$ of the feedback correction coefficients $\alpha$ from a standard value $\alpha 1$ when the engine is in the constant driving state, learning correction coefficient renewal means for operating a new learning correction coefficient Kl(new) by adding said mean value $\overline{\Delta\alpha}$ of deviations $\Delta\alpha$ by a selected ratio 1/M to a present learning correction coefficient Kl(old) retrieved by said learning correction retrieving means at every completion of said mean value $\overline{\Delta\alpha}$ of deviations $\Delta\alpha$ operation and for renewing the learning correction coefficient Kl(old) stored in the memory means under the same driving regions by said new learning correction efficient Kl(new), renewal number memory means for storing number of renewal of learning correction coefficient Kl in said memory means by receiving the output from said learning correction coefficient renewal means under the same engine driving region, and means deviation ratio setting means for setting said ratio 1/M of mean value $\overline{\Delta\alpha}$ of deviations $\Delta\alpha$ of the feedback correction coefficient $\alpha$ in accordance with the number of renewal of learning correction coefficient Kl in such a manner as the ratio 1/M decreases when the number of renewal increases.

8. An apparatus for learning and electronically controlling air-fuel ratio as set forth claim 7, wherein said basic fuel injection quantity setting means sets the basic fuel injection quantity based on a basic injection pulse width Tp of opening of said fuel injection means given by the following equations: $Tp = K \times Q/N$.

9. An apparatus for learning and electronically controlling air-fuel ratio as set forth claim 8, wherein said fuel injection quantity computing means computes the fuel injection quantity based on an injection pulse width Ti of opening of said fuel injection means given by the following equations:

$$Ti = Tp \times COEF \times Kl \times \alpha + Ts$$

wherein Ts stands for the quantity of the voltage correction efficient for correcting the change of the voltage of a battery, COEF stands for coefficients for increasing the fuel injection quantity corresponding to the engine driving states.

10. An apparatus for learning and electronically controlling air-fuel ratio as set forth claim 7, which further comprises means for detecting an abnormal condition of said memory means for storing the learning correction coefficient, and initializing means for initializing all the learning correction coefficient stored in said memory means when the abnormal condition of said memory means is detected.

11. An apparatus for learning and electronically controlling air-fuel ratio as set forth claim 10, wherein said means for detecting the abnormal condition of said memory means detects same at the engine key switch is turned on.

12. An apparatus for learning and electronically controlling air-fuel ratio as set forth claim 10, wherein and means for detecting the abnormal condition of said memory means detects disconnection of electrical power source with said memory means.

* * * * *